US008673826B2

(12) United States Patent
Dessinges et al.

(10) Patent No.: US 8,673,826 B2
(45) Date of Patent: *Mar. 18, 2014

(54) DRY BLEND FRACTURING FLUID ADDITIVES

(75) Inventors: Marie Noelle Dessinges, Houston, TX (US); Jean-Louis Pessin, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/169,105

(22) Filed: Jun. 27, 2011

(65) Prior Publication Data

US 2011/0257050 A1 Oct. 20, 2011

Related U.S. Application Data

(63) Continuation of application No. 10/941,354, filed on Sep. 15, 2004, now Pat. No. 7,972,998.

(51) Int. Cl.
 *C09K 8/68* (2006.01)
(52) U.S. Cl.
 CPC ............. *G09K 8/685* (2013.01); *Y10S 507/903* (2013.01)
 USPC .............................. 507/203; 507/211; 507/903
(58) Field of Classification Search
 USPC .................... 507/200, 211, 266, 267, 903
 See application file for complete search history.

(56) References Cited

U.S. PATENT DOCUMENTS

| | | | |
|---|---|---|---|
| 2,430,332 A | 11/1947 | Guy et al. | |
| 3,720,633 A | 3/1973 | Nickerson | |
| 3,974,077 A * | 8/1976 | Free | 507/211 |
| 4,505,826 A | 3/1985 | Horton | |
| 4,948,428 A * | 8/1990 | Liao | 106/628 |
| 5,082,579 A | 1/1992 | Dawson | |
| 5,145,590 A | 9/1992 | Dawson | |
| 5,160,643 A | 11/1992 | Dawson | |
| 5,372,732 A | 12/1994 | Harris et al. | |
| 5,488,083 A | 1/1996 | Kinsey, III et al. | |
| 5,565,513 A | 10/1996 | Kinsey, III et al. | |
| 5,658,861 A | 8/1997 | Nelson et al. | |
| 5,877,127 A | 3/1999 | Card et al. | |
| 5,981,446 A | 11/1999 | Qiu et al. | |
| 6,165,947 A | 12/2000 | Chang et al. | |
| 6,251,838 B1 | 6/2001 | Moorhouse et al. | |
| 2003/0054963 A1 | 3/2003 | Chowdhary et al. | |
| 2003/0092581 A1 * | 5/2003 | Crews | 507/100 |
| 2004/0082046 A1 | 4/2004 | Favre-Bulle et al. | |
| 2004/0235675 A1 | 11/2004 | Qiu | |
| 2006/0205605 A1 | 9/2006 | Dessinges et al. | |
| 2009/0181865 A1 | 7/2009 | Dessinges et al. | |

OTHER PUBLICATIONS

Office Action in Canadian Patent Application No. 2,577,605, dated Nov. 3, 2011.

* cited by examiner

*Primary Examiner* — Gregory Webb
(74) *Attorney, Agent, or Firm* — Jeremy Tillman; Rachel Greene; Tim Curington

(57) ABSTRACT

A method and composition for crosslinking a polymer based fluid includes providing a dry blend of crosslinker and delay agent. The crosslinker and delay agent are mixed and granulated in a dry form prior to addition to the polymer fluid.

12 Claims, 3 Drawing Sheets

DRY BLEND FRACTURING FLUID ADDITIVES

This application claims priority as a continuation application of U.S. Pat. No. 7,972,998, entitled "Dry Blend Fracturing Fluid Additives," filed Sep. 15, 2004 (issued Jul. 5, 2011), and incorporated by reference herein in its entirety.

BACKGROUND OF THE INVENTION

1. Field of the Invention

The present invention relates generally to additives for fracturing fluids. More specifically, the invention is a dry, granulated blend comprising a crosslinker and a delay agent.

2. Description of the Prior Art

In the recovery of hydrocarbons from subterranean formations it is common practice, particularly in formations of low permeability, to fracture the hydrocarbon-bearing formation, providing flow channels. These flow channels allow the oil or gas to reach the wellbore so that the oil or gas may be pumped from the well.

Water-based hydraulic fracturing fluids usually contain a hydratable polymer that acts to thicken the fracturing fluid and may be further thickened by chemically crosslinking Such a polymer typically is presented in a powder form, or in a slurried form in a hydrocarbon such as diesel, and is hydrated upon the surface of the ground, for example in a batch mix liquid operation in large mixing tanks for a significant period of time, and then mixed with other liquid additives of various types using large expensive equipment. After hydration, the polymer is typically crosslinked to further thicken the fluid and improve its viscosity at elevated temperatures often encountered in the fracture, so it can carry proppant into the fracture once it is pumped into a wellbore below the ground surface. Natural polymers include polysaccharides, such as guar and derivatives of guar such as hydroxypropyl guar (HPG), carboxymethylhydroxypropyl guar (CMHPG), carboxymethyl guar (CMG), or hydrophobically modified guar. Borate, zirconium and titanium containing crosslinking agents typically are used. Both borate and organometallic crosslinking agents offer advantages depending upon the fluid performance and cost requirements of the particular fracturing treatment.

Numerous chemical additives such as antifoaming agents, acids or bases, or other chemicals may be added to provide appropriate properties to the fluid after it is hydrated. Other additives commonly included in fracturing fluids include viscosity stabilizers, activators for crosslinking, shear recovery agents, hydration enabling agents and clay stabilizers. Generally, a viscosity stabilizer is an additive used to retard the polymer degradation from the effects of temperature, shear and iron exposure. A clay stabilizer prevents the swelling or migration of the clays in the formation.

Polymer based hydraulic fracturing fluids are well known in the oilfield services industry. These fluids are routinely used to treat and fracture subterranean formations to increase production from these formations. Typically, the fluid is prepared or mixed at the surface by combining a number of liquid additive streams with a hydrated polymer fluid. The fluid is then pumped downhole with sufficient pressure to accomplish the treatment. In certain cases, the fluid may be used to transport proppant or other additives to the formation. The viscosity of the fluid is often an important consideration in the job design. The fluid must have sufficient viscosity to transport any included solids, such as proppant; however, it cannot be so viscous that it cannot be economically pumped downhole.

Crosslinkers are commonly used to increase the viscosity of polymer based fracturing fluids. The crosslinker chemically connects or bonds the polymer chains in the fluid, thereby increasing viscosity. Well known crosslinkers of polymer fluids include boron-, zirconium- and titanium-containing compounds. In many cases, the use of a crosslinker alone causes a very rapid increase in the viscosity of the fluid and may present significant problems in terms of handling and pumping the viscosified fluid (i.e., the amount of horsepower required to pump the highly viscous fluid downhole is greater than that typically provided at the jobsite). To alleviate this problem, the crosslinking of the polymer can be delayed for a predetermined time. In this way, the fluid does not reach its full viscosity until it is downhole. Delay agents are commonly combined with the crosslinker prior to mixing the crosslinker with the polymer fluid.

Delay of the crosslinking mechanism of the polymer can be achieved using different means. One method is to physically trap or sequester the crosslinker inside a capsule that will dissolve with time under certain conditions of temperature, pH, pressure etc. Alternatively, the crosslinker may be bound to or reacted with another chemical (i.e., a delay agent). The release from this chemical delay agent will also be a function of time, temperature and relative concentrations of the crosslinker and delay agent. The delay in the crosslinking reaction is due to a ligand exchange between the crosslinker, the delay agent and the polymer. In simplified terms, the delay is determined by the time required by the crosslinker to "escape" from the delay agent and crosslink the polymer.

Although the fluid additives, including crosslinker and delay agents, are typically provided in liquid form, it is known that certain of these additives or in some cases the additives and polymer may be provided in a dry form. For instance, U.S. Pat. No. 5,372,732 (Harris), teaches a dry, granulated, delayed crosslinking agent. A borate crosslinker is combined with a liquid polysaccharide solution to produce a fluid containing highly crosslinker polymer. This solution is then dried and granulated and may then be added to a polymer fluid.

Another example of the use of a dry blend of polymer and additives is described in U.S. Pat. No. 5,981,446 (Qiu). A dry blended particulate composition which includes the polymer as well as a number of other additives is prepared and added to water to produce a fracturing fluid. The specific composition of the fluid must be predetermined and generally cannot be changed at the wellsite. This loss of flexibility can present signficant problems in terms of job completion. Decreased flexibility can also be a signficant concern during the design of the job. For example, in a typical fracturing job, initiation of the fracture is accomplished using a linear (non-crosslinked) fluid that does not contain proppant. Once the fracture is formed, the fluid is crosslinked and proppant is added. Clearly, two different blends would be needed in this case, one containing a crosslinker, the other one not containing the crosslinker.

SUMMARY OF THE INVENTION

The present invention is directed to a dry, granulated blend or composition for thickening or crosslinking polymer-based fracturing fluids. The blend is composed of a crosslinker and a delay agent. The invention also describes a method of adding this granulated blend in a dry form to a polymer based fracturing fluid typically upstream of the proppant. The number of extra additive streams is reduced as the blend combines into a single additive two or more products that were typically provided separately. This decreases the complexity of preparing or mixing the fluid, thereby decreasing the cost and time required to produce the fluid and perform a fracturing job or other formation treatment. In addition, the concentration of the crosslinker and delay agent in the blend are often tied to the concentration of the gelling agent. Therefore, the quality control of the job is better because the two critical additives are added at a fixed ratio (the blending is done ahead of the job in a controlled environment as opposed to blending at the location of the fracturing operation).

The granulated blend is prepared by providing a dry crosslinker and a dry delay agent. The crosslinker and delay agent are typically blended or mixed thoroughly in a dry form to produce a blended crosslinker/delay agent compound. The compound may then be formed into granules. Depending on the nature of the components (i.e., the crosslinker and the delay agent) it may be necessary to include a binder to aid in the formation and stability of the granules. The relative proportions of crosslinker and delay agent as well as the granule size may be adjusted to vary to length of delay, as needed. The dry, blended compound is useful in both batch mixed fluids and fluids that are "mixed on the fly." At no point during the preparation of this dry blend, are the individual components combined or provided in a liquid form. Similarly, the dry blend is not dissolved or otherwise reduced to a liquid form prior to being shaped or formed into granules.

This dry, granulated compound may be more easily stored and transported to the wellsite. In addition, preparation of the fracturing fluid is simplified, as the dry blend provides two additives in a single form, thereby reducing the number of additive streams into the fluid. Further the number of operations on location is reduced due to the reduced number of streams. A dry compound is not subject to freezing, thereby facilitating use in colder climates. In addition, the concentration of the components in the dry blend will not change due to evaporation of solvent. This is particularly beneficial in warmer climates. Yet another advantage of the dry blend is a reduction in the volume and weight of the product, as compared to a liquid additive. Further, crosslinker activity, particularly zirconium and titanium crosslinkers, has been shown to decrease with time in solution. The dry blend of the present invention reduces the time that the crosslinker is in solution prior to being combined with the polymer, thereby maintaining a higher and more consistent level of activity.

Depending on the specific application in which the compound will be used, it may be desirable to include any number of additional additives in the compound. As previously mentioned, a binder may be included to aid in the manufacturing of the dry compound. In addition, the compounds may also include a viscosity stabilizer, particularly a high temperature stabilizer, an activator or a clay stabilizer.

Using similar principles as those described above for a dry crosslinker/delay agent compound, other fluid additives may be combined in dry form to produce a single dry and/or granulated additive. For instance, the crosslinker may be combined with an activator, a viscosity stabilizer, a shear recovery agent or a hydration enabling agent, instead of the delay agent. Similarly, the delay agent may be combined with any number of suitable additives, including activators, stabilizers, shear recovery agents, hydration enabling agents and the like.

DETAILED DESCRIPTION OF THE PREFERRED EMBODIMENTS

Figure 1:
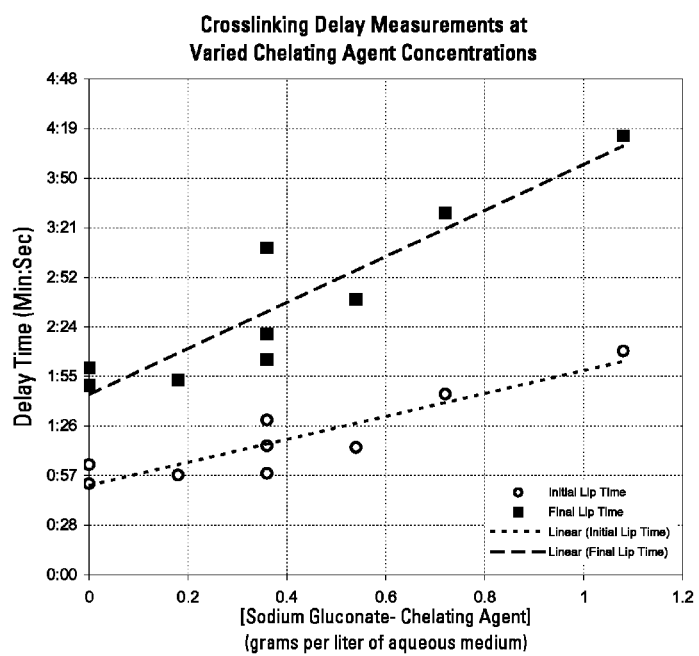
FIG. 1 is a graph showing delay time as a function of the concentration of the delay agent.

The present invention is a combined crosslinker and delay agent provided in a dry form. Preferably, the crosslinker/delay agent is provided in a granulated form. As opposed to dry additives, particularly crosslinkers and delay agents, which have been developed in the past, the present invention does not require that the individual components (i.e., the crosslinker and the delay agent) be mixed or complexed in liquid form before being dried. The crosslinker and delay agent may both be combined in dry form to produce a dry compound.

Crosslinkers useful in the present invention are those that are capable of crosslinking a polymer. In a preferred embodiment, the crosslinker contains boron. More preferably, the crosslinker is boric acid, borax, alkaline earth metal borates, alkali earth metal borates or mixtures thereof. Alternatively, the crosslinker may be a zirconium or titanium compound, or a combination or mixture of any of the above mentioned compounds.

Similarly, any number of delay agents may be used in the present invention. Examples of suitable delay agents include, but are not limited to, polyols, sodium gluconate, sorbitol, a carbonate salt or a combination of the above.

In addition to the crosslinker and delay agent, any suitable number of additional additives may be included in the dry blend material. In a preferred embodiment, a binder may be included to physically stabilize the dry blend and aid in granulation. Other additives include, but are not limited to, a crosslinker activator, a high temperature stabilizer, a breaker, a shear recovery agent and a clay stabilizer. In a preferred embodiment, the stabilizer may be an oxygen scavenger, a polyol or a carbonate salt. The clay stabilizer may be any suitable composition, but is preferably a salt such as potassium chloride. In a preferred embodiment, the breaker may be composed of an encapsulated or non-encapsulated oxidizer.

The specific delay time provided by the product of the present invention may be adjusted or modified through a number of parameters. The specific type and relative amount of crosslinker and delay agent are the two primary factors. However, granule size, fluid pH, temperature, the relative size of the particles being blended and the presence of an external delay agent, crosslinker or activator all may be used to effect the delay time provided by the granulated product.

The method of the present invention comprises providing a polymer fluid, wherein the fluid may be either fully or partially hydrated. A dry fluid additive is then mixed with the polymer fluid. The fluid additive comprises a granulated compound that includes a crosslinker and a delay agent.

In a first embodiment, the method of the present invention comprises mixing the polymer fluid and the additive in a single tank (i.e., batch mixing). The polymer is combined with a liquid and allowed to at least partially hydrate. The additive is then combined with the polymer fluid. Once the fluid and the additive are combined, the fluid may then be pumped downhole. In a second embodiment, the method comprises mixing the components "on the fly." In other words, the components are mixed as the fluid pumped downhole. It is important to note that the crosslinker/delay agent additive is provided in a dry form prior to combination or addition to the polymer fluid.

In an alternative embodiment, the dry crosslinker/delay agent additive may be added to or combined with a dry polymer. The combined additive and polymer may then be mixed with a suitable liquid stream to produce a polymer based fluid.

EXAMPLES

The following examples illustrate certain embodiments of the present invention.

FIG. 1 shows the delay obtained as a function of the concentration of delaying agent in the dry blend. The samples were prepared with a polymer fluid having a loading of 35 pounds per 1000 gallons (ppt). The polymer was fully hydrated in this example; however, in certain applications, it may be possible to add the crosslinker/delay agent before the polymer is fully hydrated. The polymer used in the experiments was guar. It should be understood that while guar was used in the example, any suitable polymer or gelling agent may be used. Preferably, the polymer is guar or derivatized guar. Preferred derivatized guars include hydroxypropyl guar, carboxymethyl hydroxypropyl guar, carboxymethyl guar or any combination of these. The polymer fluid was allowed to hydrate for approximately 30 minutes prior to crosslinking The dry blend of crosslinker and delay agent was added to the fluid while in a blender at 2000 rpm. The crosslinker was present in an amount of 1.5 pounds per thousand gallons (ppt) of fluid. The amount of delay agent varied from 0 ppt to approximately 8.5 ppt. Following addition of the crosslinker/delay agent, a caustic solution (0.45 gallons per thousand gallons (gpt) of 28% solution of caustic soda) was added and the fluid was further mixed for 10 seconds. The initial lip time and the final lip time were recorded for each sample. The initial lip time indicates the time required for a polymer fluid to develop an initial viscosity. The final lip time indicates the time required for the polymer to reach full viscosity. The crosslinker used was boric acid and the delay agent was sodium gluconate. Both were added simultaneously in the form of a powder. These results show that the crosslinker and the delay agent may be added in dry form, without prior reaction or dissolution, to crosslink a polymer fluid.

The following procedure was used in determing the lip times: the prepared fluid is poured from a container until a tongue approximately three-quarters of an inch is formed and can be retracted back into the container. This is the intial lip time. The final lip time is the time at which a two inch tongue can be poured and retracted.

In addition to use with guar-based fluids, the crosslinker/delay agent of the present invention was also tested with a CMHPG-based fluid. A 35 ppt CMHPG fluid was prepared and hydrated. The pH of the fluid was adjusted to approximately 9.46 with a 5% caustic soda solution. A 200 mL sample of the CMHPG fluid was then crosslinked with a dry blend containing sodium zirconium lactate and sodium gluconate in a molecular ratio of 40:1. The dry blend was mixed into the fluid for approximately 10 seconds. The final crosslinking time was approximately 45 seconds, which indicates that crosslinking was delayed by the dry blend. For purposes of comparison, a typical CMHPG polymer fluid under the same conditions without a delay agent would have a crosslinking time of less than 10 seconds.

Figure 2:
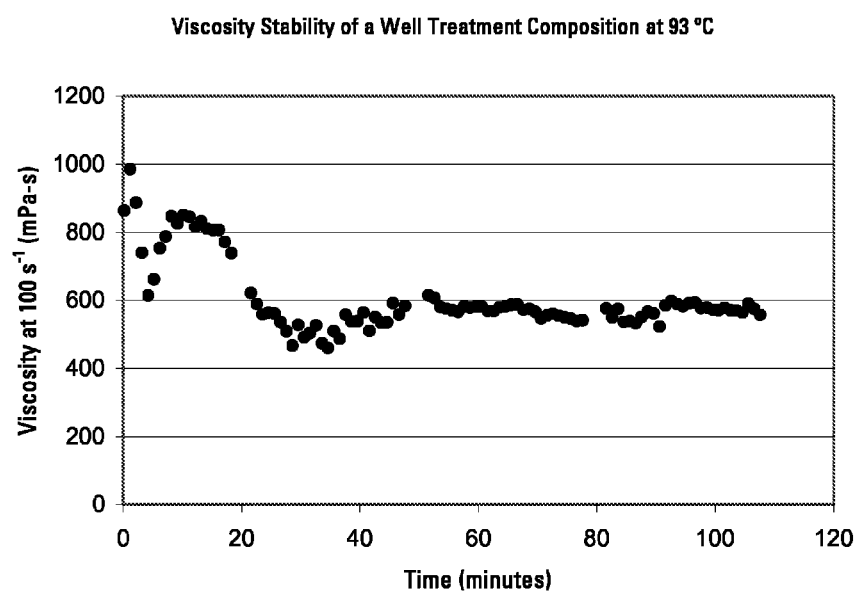
FIG. 2 is a graph showing viscosity over time for a polymer fluid.

FIG. 2 shows the stability of a fluid prepared using a dry, granulated crosslinker/delay agent. A base fluid comprising 35 ppt of dry guar was hydrated in a blender for approximately 30 minutes. The fluid was then crosslinked by adding a granulated blend at 4.7 ppt (which corresponds to 1.5 ppt boric acid and 3.0 ppt sodium gluconate and further including binder and anti-caking agents in an amount of approximately 2 wt %. The activator was a liquid solution of 28% caustic soda used at 0.45 gpt. The viscosity of the crosslinked fluid was then measured and recorded over time at 200° F. in a Fann 50 rheometer. As can be seen, the fluid remained stable and maintained a suitable viscosity at temperature for approximately 2 hours, at which point no further measurements were taken.

Figure 3:
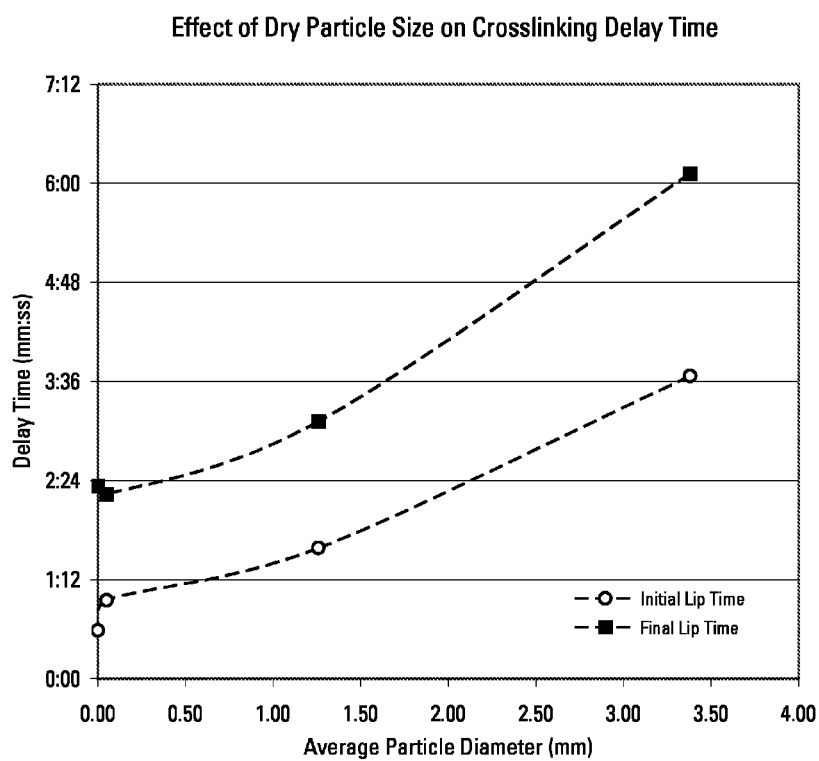
FIG. 3 is a graph showing the effect of granule size on delay time.

FIG. 3 shows the difference in delay time when the crosslinker/delay agent is added in a crushed or powdered form and granulated form. A base polymer fluid was prepared having a polymer loading of 35 ppt. The fluid was hydrated in a blender for approximately 30 minutes. Following hydration, the fluid was crosslinked with 0.45 gpt of a solution of 28% caustic soda and a crosslinker/delay agent combination having 1.5 ppt boric acid and 3.75 ppt sodium gluconate. The crosslinker/delay agent was added in a dry, crushed form and a first granular form (mesh size 10/20 (i.e., average particle diameter of 1.26 mm)) and a second granular form (mesh size 4/10 (i.e., average particle diameter of 3.38 mm)). The results show that the larger the particle diameter, the longer crosslinking is delayed, as the delay is a function of the surface area of the granule subject to dissolution. In addition, the results show that the granulated dry blend additive does crosslink the polymer fluid and does provide a suitable delay.

In addition to combining a crosslinker and delay agent in a dry blend, as previously described, the present invention may include any number of additional dry components blended together to form a single, dry additive. For instance, magnesium oxide, an activator, and sodium gluconate, a delay agent, may be combined in dry form to produce a dry blend for delaying the crosslinking of a polymer fluid. To illustrate this, a 35 ppt guar solution was prepared and hydrated. An equivalent of 2 ppt of boric acid and 5 ppt of magnesium oxide, in the form of 0.42 grams of a dry blend containing magnesium oxide and boric acid in a 2.5:1 ratio, was added to 500 mL of the hydrated guar solution and the resultant fluid mixed for approximately 10 seconds. Following this, was added and the fluid. The first lip appeared at 1 minute and the final crosslink time was approximately 2 minutes. A similar experiment was then conducted with a similar guar-based fluid. A 35 ppt guar solution was prepared and hydrated. An equivalent of 2 ppt of boric acid was then added to 500 mL of the hydrated guar solution and the resultant fluid was mixed for 30 seconds. A dry blend of MgO and sodium gluconate, in a 1:1 ratio, was then added in place of the MgO/boric acid blend. The final crosslink time was approximately 4 minutes.

We claim:

1. A polymer fluid with delayed crosslinking, comprising: a hydratable polymer that has at least partially hydrated, and a dry, particulate blend comprising:
   a crosslinker; and
   a delay agent selected from the group consisting of polyols, sodium gluconate, sorbitol, and combinations thereof;
   wherein the dry particulate blend contains no crosslinkable polymer.

2. The fluid of claim 1, wherein said crosslinker contains boron.

3. The fluid of claim 1, wherein said crosslinker contains zirconium.

4. The fluid of claim 1, wherein said crosslinker contains titanium.

5. The fluid of claim 1, wherein said crosslinker comprises at least two or more of the following: a boron containing compound, a titanium containing compound and a zirconium containing compound.

6. The fluid of claim 2, wherein said crosslinker is selected from the group consisting of: boric acid, borax, alkaline earth metal borates, alkali earth metal borates or mixtures thereof.

7. The fluid of claim 1, wherein said delay agent is selected from the group consisting of: sodium gluconate, sorbitol or a combination thereof.

8. The fluid of claim 1, further comprising a viscosity stabilizer.

9. The fluid of claim 1, further comprising a dry polysaccharide polymer.

10. The fluid of claim 1, further comprising an activator for the crosslinker.

11. A method of forming a fluid comprising a fluid additive having utility for addition to a polymer fluid for delayed crosslinking, comprising:
   providing a fluid comprising a hydratable polymer that has at least partially hydrated;
   providing a fluid additive comprising:
      a particulate crosslinker; and
      a particulate delay agent selected from the group consisting of polyols, sodium gluconate, sorbitol, and combinations thereof;
   wherein the dry crosslinker and the dry component are single compound granules.

12. The method of claim 11, wherein said fluid additive further comprises a crosslinker activator.

* * * * *